(12) United States Patent
Hino (10) Patent No.: US 11,579,113 B2
(45) Date of Patent: *Feb. 14, 2023

(54) GAS SENSOR ELEMENT (71) Applicant: NGK INSULATORS, LTD., Nagoya (JP)

(72) Inventor: Takashi Hino, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 249 days.

This patent is subject to a terminal disclaimer.

(21) Appl. No.: 15/938,391

(22) Filed: Mar. 28, 2018

(65) Prior Publication Data
US 2018/0284055 A1 Oct. 4, 2018

(30) Foreign Application Priority Data

Mar. 30, 2017 (JP) .............................. JP2017-067611

(51) Int. Cl.
*G01N 27/407* (2006.01)
*G01N 27/406* (2006.01)
*G01N 27/41* (2006.01)

(52) U.S. Cl.
CPC ..... *G01N 27/4072* (2013.01); *G01N 27/4067* (2013.01); *G01N 27/4074* (2013.01); *G01N 27/4077* (2013.01); *G01N 27/41* (2013.01)

(58) Field of Classification Search
CPC ........... G01N 27/4072; G01N 27/4067; G01N 27/4074; G01N 27/4077; G01N 27/41
See application file for complete search history.

(56) References Cited

U.S. PATENT DOCUMENTS

| 2003/0159928 A1* | 8/2003 | Kojima | G01N 27/4067 204/408 |
| 2009/0255812 A1* | 10/2009 | Yoshida | G01N 27/4077 204/431 |
| 2011/0186431 A1* | 8/2011 | Horisaka | G01N 27/4077 204/424 |
| 2012/0211362 A1* | 8/2012 | Onkawa | G01N 27/4077 204/424 |

(Continued)

FOREIGN PATENT DOCUMENTS

| JP | 2011-237222 A | 11/2011 |
| JP | 2015194479 A | * 11/2015 |

(Continued)

*Primary Examiner* — Maris R Kessel
*Assistant Examiner* — Vivian A Tran
(74) *Attorney, Agent, or Firm* — Mattingly & Malur, PC (57) ABSTRACT

A sensor element includes: an element base made of an oxygen-ion conductive solid electrolyte; an internal space provided inside the element base; an electrochemical pump cell configured to pump oxygen in and out between the internal space and outside; a porous thermal shock resistant layer provided to an outermost peripheral part in a predetermined range at one end part of the element base, at which a gas inlet is provided; and a buffer layer adjacent to the thermal shock resistant layer on a pump surface and a heater surface. A thermal diffusion time in a thickness direction of the thermal shock resistant layer is 0.4 sec to 1.0 sec inclusive, and a total thermal diffusion time in a stacking direction of the thermal shock resistant layer and the buffer layer is 0.2 sec to 1.0 sec inclusive.

13 Claims, 4 Drawing Sheets

(56) References Cited

U.S. PATENT DOCUMENTS

| | | | |
|---|---|---|---|
| 2013/0104625 A1* | 5/2013 | Otsuka | G01N 27/4077 73/23.31 |
| 2014/0130572 A1* | 5/2014 | Otsuka | G01N 27/4077 73/23.31 |
| 2014/0291150 A1* | 10/2014 | Otsuka | G01N 27/4118 204/424 |
| 2015/0040642 A1* | 2/2015 | Oya | G01N 27/4071 73/23.32 |
| 2015/0075254 A1* | 3/2015 | Sakuma | G01M 15/104 73/23.31 |
| 2015/0114102 A1* | 4/2015 | Onkawa | G01N 27/4077 73/114.72 |
| 2015/0276661 A1* | 10/2015 | Moriyama | C04B 35/62625 204/424 |
| 2015/0355142 A1* | 12/2015 | Murakami | G01N 27/4077 324/464 |
| 2016/0018357 A1 | 1/2016 | Nishijima et al. | |
| 2016/0061767 A1* | 3/2016 | Peters | G01N 27/4074 204/424 |
| 2016/0161445 A1* | 6/2016 | Sakakibara | G01N 27/419 204/424 |
| 2018/0284054 A1* | 10/2018 | Hino | G01N 27/4067 |

FOREIGN PATENT DOCUMENTS

| | | |
|---|---|---|
| JP | 2016-029360 A | 3/2016 |
| WO | 2011/138652 A1 | 11/2011 |

* cited by examiner

GAS SENSOR ELEMENT

CROSS-REFERENCE TO RELATED APPLICATION

The present application claims priority from Japanese application JP 2017-067611, filed on Mar. 30, 2017, the content of which is hereby incorporated by reference into this application.

BACKGROUND OF THE INVENTION

Field of the Invention

The present invention relates to a sensor element provided to a gas sensor configured to detect a predetermined gas component in measurement gas, and particularly relates to a configuration for preventing water-induced cracking of the sensor element.

Description of the Background Art

A conventionally widely known gas sensor includes a sensor element made of an oxygen-ion conductive solid electrolyte such as zirconia ($ZrO_2$) and provided with electrodes on a surface and inside thereof. Such a gas sensor is used to determine concentration of a desired gas component in measurement gas. The sensor element potentially cracks due to thermal shock attributable to water droplets adhered on the surface of the sensor element. In some configurations, a protective layer (porous protective layer) made of porous solid is provided to prevent such water-induced cracking.

In a publicly known gas sensor (refer to Japanese Patent Application Laid-Open No. 2011-237222, for example) including a sensor element provided with such a porous protective layer, the porous protective layer is made of a single material such as silicon carbide or aluminum nitride and has a thermal conductivity and a specific surface area within predetermined ranges. This configuration reduces an amount of water infiltrating into the sensor element, thereby preventing water-induced cracking of the sensor element.

In a publicly known manner (refer to Japanese Patent Application Laid-Open No. 2016-29360, for example), ranges of values of a thermal conductivity $\lambda$ and a product $\lambda \rho Cp$ of the thermal conductivity $\lambda$, a density $\rho$, and a specific heat $Cp$ are defined to achieve such a desirable water repellency of the porous protective layer in a sensor element that water droplets adhered to the porous protective layer of the sensor element are repelled due to the Leidenfrost phenomenon.

With the manner disclosed in Japanese Patent Application Laid-Open No. 2016-29360, it is enabled to judge quality of the water resistance based on quality of the water repellency. However, Japanese Patent Application Laid-Open No. 2016-29360 does not disclose or suggest the quality of the water resistance of a sensor element having an excellent water repellency.

How much water-induced cracking is likely to occur to a sensor element depends on the ease (speed) of heat transfer in the porous protective layer. However, the thermal conductivity, which is described in Japanese Patent Application Laid-Open Nos. 2011-237222 and 2016-29360, is a parameter indicating the likelihood of heat transfer, but is not a parameter indicating the ease of heat transfer.

The water-induced cracking attributable to adhesion of water droplets may occur locally at any portion of a sensor element, which contacts with measurement gas. However, Japanese Patent Application Laid-Open Nos. 2011-237222 and 2016-29360 each merely show one cross-section of a sensor element (gas sensor element), and thus it is not necessarily clear how the porous protective layer is included in a sensor element to which the water-induced cracking is unlikely to occur.

SUMMARY

The present invention is directed to a sensor element provided to a gas sensor configured to detect a predetermined gas component of measurement gas, and particularly relates to a configuration for preventing water-induced cracking of the sensor element.

According to the present invention, a sensor element provided to a gas sensor configured to detect a predetermined gas component in measurement gas includes: an elongated plate element base made of an oxygen-ion conductive solid electrolyte and having a gas inlet at one end part; at least one internal space provided inside the element base and communicated with the gas inlet under predetermined diffusion resistance; at least one electrochemical pump cell including an outer pump electrode formed on an outer surface of the element base, an inner pump electrode provided facing the at least one internal space, and a solid electrolyte located between the outer pump electrode and the at least one inner pump electrode, the at least one electrochemical pump cell configured to pump oxygen in and out between the at least one internal space and outside; a heater buried in a predetermined range at the one end part of the element base; a porous thermal shock resistant layer provided to an outermost peripheral part in the predetermined range at the one end part of the element base; a buffer layer located on an inner side with respect to the thermal shock resistant layer and adjacent to the thermal shock resistant layer on a pump surface and a heater surface of the sensor element. Among two main surfaces of the element base, a main surface closer to the gas inlet, the at least one internal space, and the at least one electrochemical pump cell than to the heater in a thickness direction of the element base is defined as the pump surface of the sensor element, and a main surface closer to the heater than to the gas inlet, the at least one internal space, and the at least one electrochemical pump cell is defined as the heater surface of the sensor element. The sensor element is configured and arranged such that a thermal diffusion time in a thickness direction of the thermal shock resistant layer is 0.4 sec to 1.0 sec inclusive at a portion where the buffer layer is not provided, and a total thermal diffusion time in a stacking direction of the thermal shock resistant layer and the buffer layer is 0.2 sec to 1.0 sec inclusive at a portion where the thermal shock resistant layer and the buffer layer are stacked.

The present invention excellently prevents water-induced cracking of a gas sensor element, for example, when attached to an exhaust pipe of an internal combustion such as an engine and used.

An object of the present invention is to provide a gas sensor element to which water-induced cracking is unlikely to occur.

These and other objects, features, aspects and advantages of the present invention will become more apparent from the following detailed description of the present invention when taken in conjunction with the accompanying drawings.

DESCRIPTION OF THE PREFERRED EMBODIMENTS

<Outline of Gas Sensor>

Figure 1:
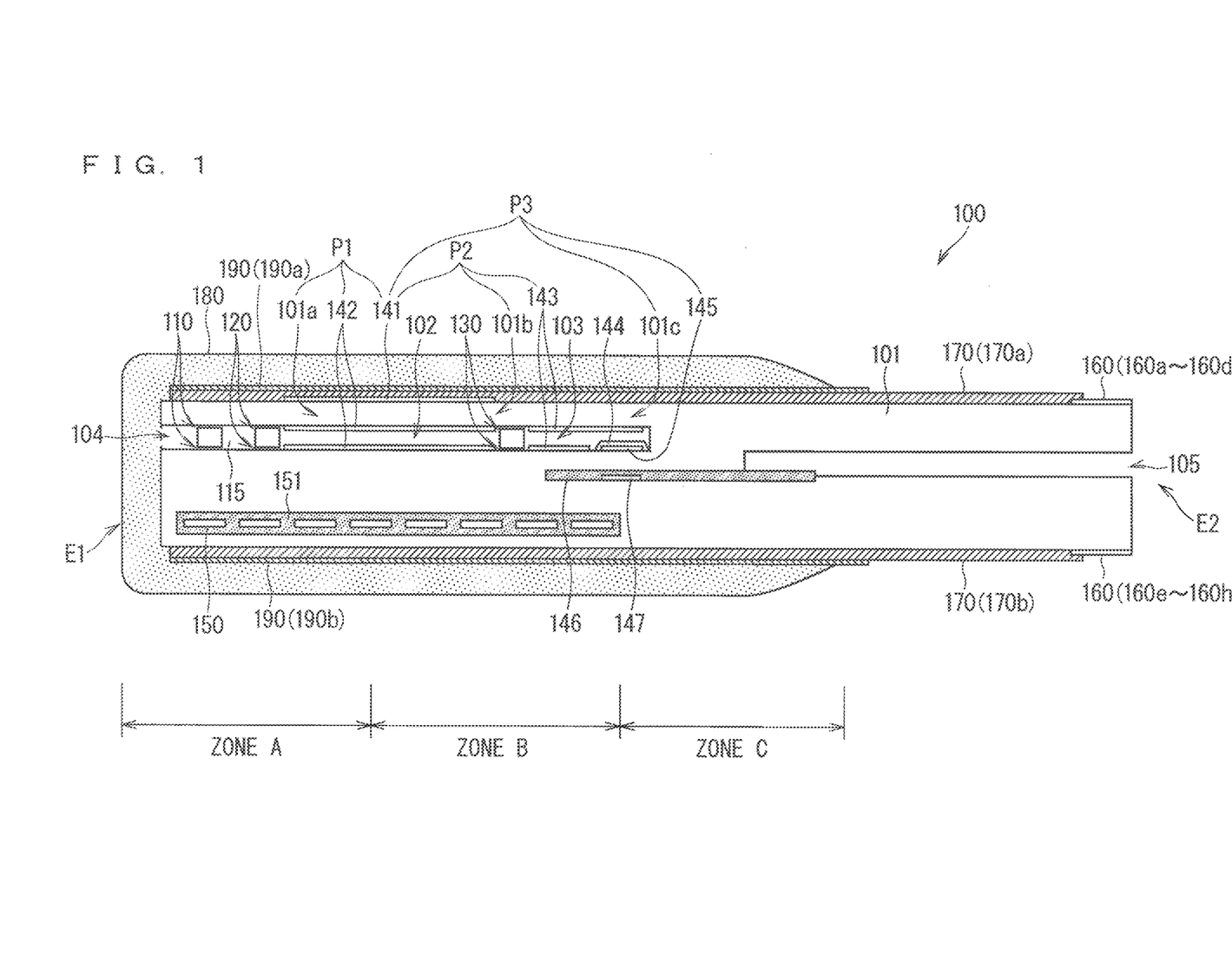
FIG. 1 is a vertical cross-sectional view schematically illustrating a structure of a sensor element 100 along a longitudinal direction of the sensor element 100.

FIG. 1 is a vertical cross-sectional view schematically illustrating a structure of a gas sensor element (hereinafter also simply referred to as sensor element) 100 according to the present preferred embodiment along a longitudinal direction of the sensor element 100. The sensor element 100 is a limiting-current type gas sensor element as a main component of a gas sensor (not illustrated) configured to detect a predetermined gas component in measurement gas and measure the concentration of the gas.

The sensor element 100 illustrated in FIG. 1 includes, as a main structure, an elongated plate element base 101 mainly made of ceramics containing zirconia (yttrium-stabilized zirconia), which is an oxygen-ion conductive solid electrolyte. Various kinds of components are provided outside and inside the element base 101. The element base 101 having such a configuration is dense and air-tight. The configuration of the sensor element 100 illustrated in FIG. 1 is merely exemplary and does not limit the specific configuration of the sensor element 100.

The sensor element 100 illustrated in FIG. 1 is a so-called serial double-chamber structure type gas sensor element including a first internal space 102 and a second internal space 103 which are internal spaces provided inside the element base 101. Specifically, in the element base 101, the first internal space 102 is communicated, through a first diffusion control part 110 and a second diffusion control part 120, with a gas inlet 104 externally opened at one end E1 of the element base 101 (to be precise, communicated through a thermal shock resistant layer 180 to be described later), and the second internal space 103 is communicated with the first internal space 102 through a third diffusion control part 130. A path from the gas inlet 104 to the second internal space 103 is also referred to as a gas distribution part. In the sensor element 100 according to the present preferred embodiment, the distribution part is provided straight along a longitudinal direction of the element base 101.

The first diffusion control part 110, the second diffusion control part 120, and the third diffusion control part 130 are each provided as two slits on upper and lower sides in FIG. 1. The first diffusion control part 110, the second diffusion control part 120, and the third diffusion control part 130 each apply predetermined diffusion resistance to measurement gas passing therethrough. A buffer space 115 is provided between the first diffusion control part 110 and the second diffusion control part 120 to buffer pulsing of the measurement gas.

An external pump electrode 141 is provided on an outer surface of the element base 101. An inner pump electrode 142 is provided in the first internal space 102. An auxiliary pump electrode 143 and a measurement electrode 145 covered by a protective layer 144 are provided in the second internal space 103. A reference gas inlet 105 that is externally communicated and through which reference gas is introduced is provided at another end E2 of the element base 101. A reference electrode 147 is provided in a porous alumina layer 146 communicated with the reference gas inlet 105 inside the element base 101.

For example, when NOx in measurement gas is measured by the sensor element 100, the concentration of NOx gas in the measurement gas is calculated through a process as described below.

First, having introduced into the first internal space 102, the measurement gas is adjusted to have substantially constant oxygen concentration by pumping operation of a main pump cell P1 (by pumping oxygen in or out), and then introduced into the second internal space 103. The main pump cell P1 is an electrochemical pump cell including the external pump electrode 141, the inner pump electrode 142, and a ceramic layer 101a as part of the element base 101 located between the electrodes. Similarly, in the second internal space 103, oxygen in the measurement gas is pumped out of the element by pumping operation of an auxiliary pump cell P2 as an electrochemical pump cell, so that the measurement gas has sufficiently low oxygen partial pressure. The auxiliary pump cell P2 includes the external pump electrode 141, the auxiliary pump electrode 143, and a ceramic layer 101b as part of the element base 101 located between the electrodes.

The external pump electrode 141, the inner pump electrode 142, and the auxiliary pump electrode 143 are formed as porous cermet electrodes (for example, cermet electrodes made of Pt containing 1% of Au, and $ZrO_2$). The inner pump electrode 142 and the auxiliary pump electrode 143, which contact with the measurement gas, are each made of a material having weakened or no reducing ability for an NOx component in the measurement gas.

NOx in the measurement gas made into the low oxygen partial pressure state by the auxiliary pump cell is reduced or dissolved at the measurement electrode 145 provided in the second internal space 103. The measurement electrode 145 is a porous cermet electrode also functioning as an NOx reduction catalyst that reduces NOx existing in an atmosphere inside the second internal space 103. The potential difference between the measurement electrode 145 and the reference electrode 147 is maintained constant through the reduction or dissolution. Oxygen ions generated through the reduction or dissolution are pumped out of the element by a measurement pump cell P3. The measurement pump cell P3 includes the external pump electrode 141, the measurement electrode 145, and a ceramic layer 101c as part of the element base 101 located between the electrodes. The measurement pump cell P3 is an electrochemical pump cell configured to pump out oxygen generated through the NOx dissolution in an atmosphere around the measurement electrode 145. The sensor element 100 detects, in accordance with the amount of pumped out oxygen, pump current Ip2 flowing between the measurement electrode 145 and the external pump electrode 141. The NOx sensor calculates the concentration of NOx in the measurement gas based on the linear relation between the current value (NOx signal) of the pump current Ip2 and the concentration of dissolved NOx.

The pumping (pumping oxygen in or out) by the main pump cell P1, the auxiliary pump cell P2, and the measurement pump cell P3 is achieved when voltage necessary for pumping is applied between the electrodes provided to each pump cell by a predetermined variable power source (not illustrated) as a component of the gas sensor, similar to the sensor element 100. In a case of the measurement pump cell P3, voltage is applied between the external pump electrode 141 and the measurement electrode 145 so that the potential difference between the measurement electrode 145 and the reference electrode 147 is maintained at a predetermined value. Typically, the variable power sources are provided for each pump cell.

In the sensor element 100, a heater 150 is buried inside the element base 101. The heater 150 is provided, on the lower side of the gas circulation unit in FIG. 1, in a range extending from the vicinity of the one end E1 to the vicinities of positions at which the measurement electrode 145 and the reference electrode 147 are formed. The heater 150 is provided mainly to heat the sensor element 100 so that the oxygen-ion conductivity of the solid electrolyte is increased when the sensor element 100 is used. For example, when used, the sensor element 100 is heated by the heater 150 so that the temperature reaches at 800° C. to 850° C. approximately near the first internal space 102 heated to a highest temperature. The heater 150 is a resistance heating element made of, for example, platinum. More specifically, the heater 150 is surrounded by an insulating layer 151.

In the following description, among two main surfaces of the element base 101, a main surface (or an outer surface of the sensor element 100 on which the main surface is provided) positioned on the upper side in FIG. 1, where the main pump cell P1, the auxiliary pump cell P2, and the measurement pump cell P3 are mainly provided, is also referred to as a pump surface, and a main surface (or an outer surface of the sensor element 100 on which the main surface is provided) positioned on the lower side in FIG. 1, where the heater 150 is provided, is also referred to as a heater surface. In other words, the pump surface is a main surface on a side closer to the gas inlet 104, the two internal spaces, and the pump cells than to the heater 150, and the heater surface is a main surface on a side closer to the heater 150 than to the gas inlet 104, the two internal spaces, and the pump cells.

A plurality of electrode terminals 160 are provided at the other end E2 on the main surfaces of the element base 101 to achieve electrical connection between the sensor element 100 and the outside. Specifically, in the sensor element 100 illustrated in FIG. 1, the four electrode terminals 160 (160a to 160d) are provided on the pump surface, and the four electrode terminals 160 (160e to 160h) are provided on the heater surface. The electrode terminals 160 are electrically connected with the above-described five electrodes, both ends of the heater 150, and a heater resistance detection lead (not illustrated) through lead wires (not illustrated) provided inside the element base 101, under a predetermined correspondence relations. With this configuration, voltage application to each pump cell in the sensor element 100 and heating of the heater 150 are performed through the electrode terminals 160.

In the sensor element 100, a part explained herein above, which includes the element base 101 including the above-described first and second internal spaces and the other internal space such as the reference gas space, and the various kinds of electrodes (including the protective layer 144) and the leads, the electrode terminals 160, the heater 150, and the insulating layer 151 provided to the element base 101, is also referred to as a sensor element main part.

In addition, surface protective layers 170 (170a and 170b) are provided on the pump surface and the heater surface of the element base 101, respectively. The surface protective layers 170 are each made of alumina, has a thickness of 5 μm to 30 μm approximately, and includes pores at a porosity of approximately 20% to 40%. The surface protective layers 170 are provided to prevent adhesion of foreign objects and poisoning materials onto the surfaces of the element base 101 and the external pump electrode 141 provided on the pump surface. Thus, the surface protective layer 170a on the pump surface functions as a pump electrode protective layer protecting the external pump electrode 141.

In the present preferred embodiment, the porosity is calculated by applying a well-known image processing method (e.g. binarization processing) to a scanning electron microscope (SEM) image of an evaluation target.

In FIG. 1, the surface protective layers 170 are provided substantially entirely across the pump surface and the heater surface except for exposed parts of the electrode terminals 160, which is, however, merely exemplary. The surface protective layers 170 may be locally provided near the external pump electrode 141 at the one end E1 as compared to the configuration illustrated in FIG. 1. Alternatively, no surface protective layer 170b may be provided on the heater surface.

Figure 2:
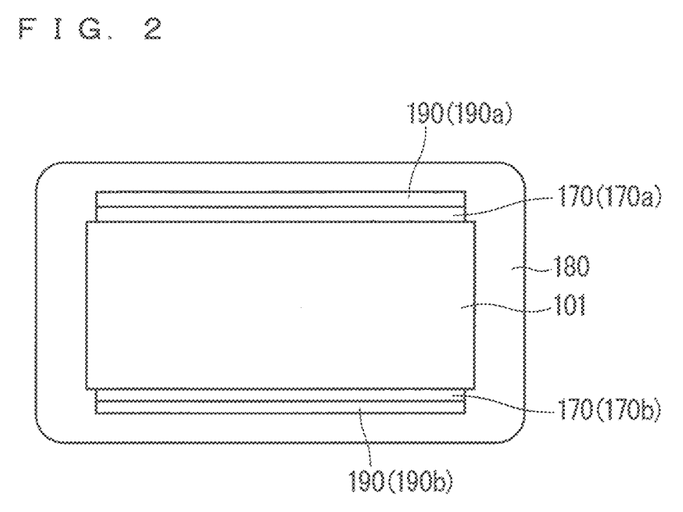
FIG. 2 is a schematic diagram of a section orthogonal to the longitudinal direction of the sensor element 100, illustrating an arrangement relation between an element base 101, a surface protective layer 170, a thermal shock resistant layer 180, and a buffer layer 190.

In the sensor element 100, the thermal shock resistant layer 180, which is a porous layer made of alumina having a purity of 99.0% or higher, is further provided at an outermost peripheral part within a predetermined range from the one end E1 of the element base 101. In addition, a buffer layer 190 is interposed between the thermal shock resistant layer 180 and each surface protective layer 170. FIG. 2 is a schematic diagram of a section orthogonal to the longitudinal direction of the sensor element 100, illustrating an arrangement relation between the element base 101, the surface protective layers 170, the thermal shock resistant layer 180, and the buffer layers 190. FIG. 2 omits illustrations of the electrodes and the internal spaces.

As understood from FIGS. 1 and 2, the thermal shock resistant layer 180 entirely covers the one end E1 of the element base 101 and further covers, within a predetermined range from the one end E1 in the element longitudinal direction, not only the pump surface and the heater surface but also side surfaces at the one end E1 of the element base 101. On the other hand, the buffer layers 190 are provided only on the pump surface and the heater surface of the element base 101 similarly to the surface protective layers 170, within a range slightly wider than a range where the thermal shock resistant layer 180 is provided.

In the sensor element 100 having the above-described configuration, the sensor element main part, the surface protective layers 170, and the buffer layers 190, in other words, a part except for the thermal shock resistant layer 180 can be manufactured through a well-known green sheet process. Specifically, a plurality of ceramic green sheets are subjected to, predetermined processing including punching for forming portions serving as internal spaces such as the first and second internal spaces after the completion of the sensor element, and printing of patterns of the electrodes and the corresponding lead wires, the protective layer 144, the heater 150, the insulating layer 151, the surface protective layers 170, the buffer layers 190, and the like. Then, the plurality of ceramic green sheets are integrated with each other by stacking and bonding to obtain a laminated body. Thereafter, element bodies obtained by dividing the laminated body into individual pieces are fired, so that the sensor element is obtained. Some sites such as the surface protective layers 170 and the buffer layers 190 may be formed by printing corresponding patterns, not onto the green sheets, but onto the laminated body yet to be divided into individual pieces.

On the other hand, the thermal shock resistant layer 180 is formed by applying a well-known method such as plasma spraying, spray coating, gel cast, or dipping to a fired body (in other words, the sensor element 100 except for the thermal shock resistant layer 180) obtained by formation of the sensor element main part and the surface protective layers 170 through the green sheet process. Each method allows easy control of the thickness (film thickness) of the thermal shock resistant layer 180. As for plasma spraying, a resultant sprayed film includes pores due to a characteristic of the method, and the porosity of the sprayed film can be controlled by adjusting, for example, output power, an irradiation angle, and the property of powder material. As for gel cast or dipping, which uses alumina slurry as a row material, the porosity of the thermal shock resistant layer 180 can be controlled by controlling the condition of a pore forming material added to the slurry. The tilt of an end face of the thermal shock resistant layer 180 at the other end E2, which is exemplarily illustrated in FIG. 1, is likely to be provided when the thermal shock resistant layer 180 is formed by plasma spraying or dipping.

<Details of Thermal Shock Resistant Layer and Buffer Layer>

The thermal shock resistant layer 180 is provided to have a property of water resistance to mainly prevent so-called water-induced cracking of the sensor element 100. The water-induced cracking is a phenomenon which occurs to the sensor element 100, the element base 101 in particular (the element base 101 cracks), while the gas sensor is used, due to thermal shock attributable to water droplets adhered to the sensor element 100 heated to high temperature by the heater 150. In some cases, the cracking of the element base 101 occurs with break of the electrodes and cracking of the surface protective layers 170.

Such water-induced cracking might occur, for example, in the case that the gas sensor including the sensor element 100 is disposed halfway through an exhaust pipe of an internal combustion of an automobile or the like, with the one end E1 of the sensor element 100 protruding into the exhaust pipe. More specifically, when measurement is performed in such a manner, the sensor element 100 is surrounded by a metal protection cover through which the exhaust gas is allowed to be taken in and out, instead of being directly exposed in the exhaust pipe. Water vapor contained in the exhaust gas having entered into the protection cover condenses and adheres to the sensor element 100 in some cases. Water-induced cracking occurs in such a case.

In the sensor element 100 according to the present preferred embodiment, the thermal shock resistant layer 180 is formed within a predetermined range from the one end E1, where water droplets are likely to adhere, and not over the entire sensor element 100, because it is provided to mainly prevent such water-induced cracking. Specifically, the thermal shock resistant layer 180 is formed within a range of 12 mm to 14 mm approximately in the element longitudinal direction. The thermal shock resistant layer 180 may be formed within a range extending farther toward the other end E2 in accordance with the configuration of the sensor element 100. In FIG. 1, the end face of the thermal shock resistant layer 180 at the other end E2 is tilted, but this is not essential. The thermal shock resistant layer 180 is formed to have a thickness of at least 200 μm or larger. If the thickness is smaller than 200 μm, the strength of the thermal shock resistant layer 180 itself is insufficient, and pores formed in the thermal shock resistant layer 180 may penetrate through the thermal shock resistant layer 180 (further may penetrate the buffer layer 190) so that water vapor in the measurement gas is more likely to directly reach the surface protective layer 170 or further at the element base 101. Thus, such a thickness is not preferable. As for the upper limit of the thickness, there is no particular restriction attributable to the functionality of the thermal shock resistant layer 180. However, if the thickness of the thermal shock resistant layer 180 is too large, the measurement gas is unlikely to pass through the thermal shock resistant layer 180 and reach the gas inlet 104, which degrades the responsiveness of the gas sensor and also leads to disadvantage in cost. Thus, such a thickness is not preferable. For this reason, the thickness of the thermal shock resistant layer 180 is preferably 900 μm or smaller. The thickness of the thermal shock resistant layer 180 can be evaluated by transmissive X-ray irradiation.

The porosity of the thermal shock resistant layer 180 is preferably set to approximately 15% to 25% from the viewpoint of easiness and uniformity in manufacturing, and having less influence to intake of the measurement gas into the element base 101 through the gas inlet 104. However, any value out of this range is applicable as long as the occurrence of water-induced cracking is excellently prevented and the responsiveness of the sensor element 100 is not affected.

On the other hand, each buffer layer 190 is provided to prevent the occurrence of peeling and breakdown of the thermal shock resistant layer 180 when the sensor element 100 is used, which are attributable to the difference between the thermal expansion rates of alumina constituting the thermal shock resistant layer 180 and zirconia constituting the element base 101.

Since the sensor element 100 is heated by the heater 150 when used, the element base 101 made of zirconia, which has a large heat expansion coefficient, thermally expands more than the thermal shock resistant layer 180. As a result, tensile stress is applied on the thermal shock resistant layer 180. Thus, when the sensor element 100 is provided with no buffer layer 190, there is a case that the thermal shock resistant layer 180 is broken down due to application of the tensile stress under a certain use condition. The buffer layers 190 are provided to reduce the thermal expansion difference between the element base 101 and the thermal shock resistant layer 180, thereby preventing the breakdown of the thermal shock resistant layer 180.

Similarly to the thermal shock resistant layer 180, each buffer layer 190 is a porous layer made of alumina, but has a porosity of 25% to 30%, which is higher than that of the thermal shock resistant layer 180, and a thickness of 20 μm to 50 μm. To achieve reduction of the thermal expansion difference between the element base 101 and the thermal shock resistant layer 180, the buffer layer 190 only has to be formed within a range corresponding to the formation range of the thermal shock resistant layer 180.

Each surface protective layer 170 is made of alumina but has a porosity and a thickness smaller than those of the buffer layer 190. Thus, the surface protective layer 170 is hardly expected to provide the effect of reducing the thermal expansion difference, which is provided by the buffer layer 190.

<Method of Evaluating Water Resistance>

As described above, the thermal shock resistant layer 180 is a porous layer provided to prevent the water-induced cracking of the sensor element 100. Typically, the structure of a porous layer is defined based on the thickness and porosity thereof, but requirements on the property of the water resistance of the thermal shock resistant layer 180 having a favorable water repellency is assumed to depend on the ease of heat transfer in the thermal shock resistant layer 180. Thus, if possible, it is more preferable to define the water resistance based on an index directly representing the ease of heat transfer than based on an index using the thickness or the porosity. According to preliminary study performed by the inventor of the present invention, a strong correlation was not necessarily confirmed between the thickness or the porosity and the water resistance.

Each buffer layer 190 is provided to prevent, for example, peeling of the thermal shock resistant layer 180, but it is a porous layer having a porosity higher than that of the thermal shock resistant layer 180. Thus, in consideration of the water-induced cracking prevention, it is desired to consider preferable requirements on the buffer layer 190 as well as requirements on the thermal shock resistant layer 180.

Generally, a thermal diffusivity is known as a parameter representing the ease of heat transfer, which represents the ease of heat transfer per constant area. When the ease of heat transfer is assumed to be same in a thickness direction and an in-plane direction orthogonal to the thickness direction for the thermal shock resistant layer 180 and the buffer layer 190, which are porous layers including pores, the thermal diffusivities of the thermal shock resistant layer 180 and the buffer layer 190 are each given by the following equation:

$$\text{Thermal diffusivity} = (\text{Thickness})^2 / \text{Thermal diffusion time} \quad (1)$$

In the equation, the thermal diffusion time is a time required for thermal conduction in the thickness direction in the thermal shock resistant layer 180 or each buffer layer 190. The thermal conduction in the thickness direction takes a longer time as the thermal diffusion time is longer.

The inventor made a study on evaluation of the water resistance by using the thermal diffusion time as an index. The reason is that it is thought that the water-induced cracking attributable to thermal shock is unlikely to occur if the thermal diffusion time is sufficiently long for the thermal shock resistant layer 180 and the buffer layer 190, because heat applied to the outermost surface of the thermal shock resistant layer 180 takes time to reach the surface protective layer 170 or the element base 101 through the buffer layer 190.

Equation (1) can be rewritten as follows:

$$\text{Thermal diffusion time} = (\text{Thickness})^2 / \text{Thermal diffusivity} \quad (2)$$

In other words, when the thicknesses and thermal diffusivities of the thermal shock resistant layer 180 and the buffer layer 190 are known, the thermal diffusion time in each thickness direction is specified.

However, although the thermal diffusivity can be typically measured for a bulk material by the well-known laser flash method, it is difficult to perform the measurement for the thermal shock resistant layer 180 and the buffer layer 190 actually provided to the sensor element 100. The inventor of the present invention produced a plurality of test pieces (bulk specimens) having various kinds of porosities by using an alumina material same as that of the thermal shock resistant layer 180 and the buffer layer 190 and measured the thermal diffusivity for the test pieces by the laser flash method. Accordingly, it was experimentally confirmed that the thermal diffusivity and the porosity of each test piece have a relation (linear relation) therebetween represented by a linear expression ($\alpha<0$, $\beta>0$) below:

$$\text{Thermal diffusivity} = \alpha \cdot \text{Porosity} + \beta \quad (3)$$

Figure 3:
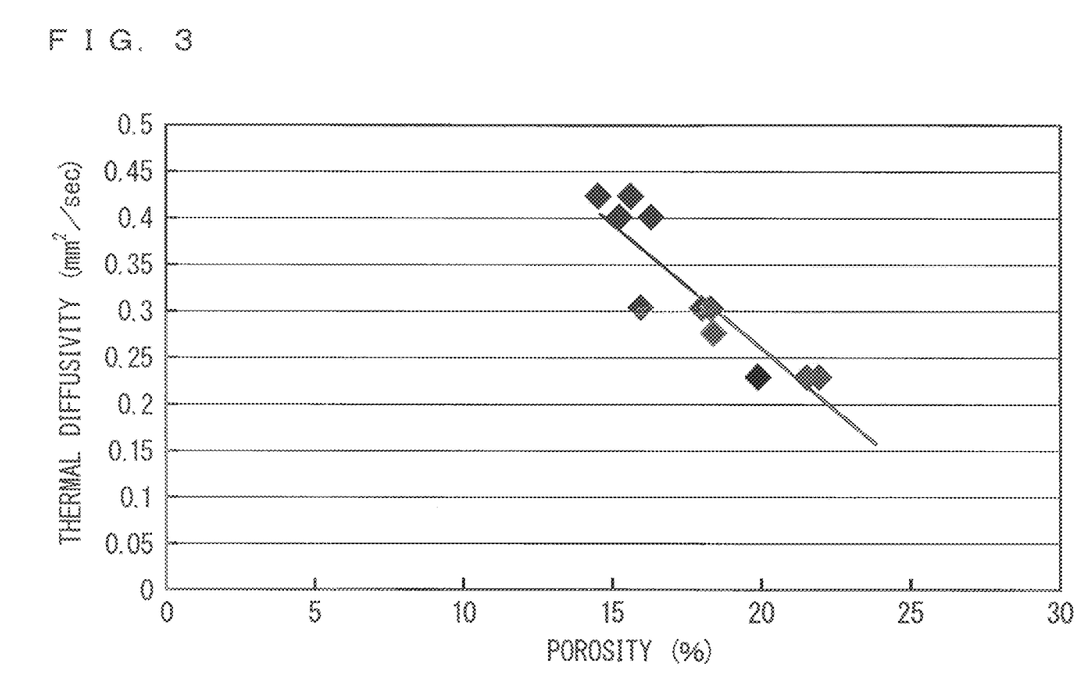
FIG. 3 is a diagram plotting a thermal diffusivity of a test piece against a porosity thereof.

FIG. 3 is a diagram plotting actually measured thermal diffusivities of the total of 12 kinds of test pieces against the corresponding porosities. The porosities of the produced test pieces were approximately 14% to 22%.

The expression of an approximate straight line illustrated in FIG. 3 is given by:

$$y = -0.0268x + 0.7986 \quad (4)$$

where x represents the porosity and y represents the thermal diffusivity. The determination coefficient $R^2$ of the straight line has a value of 0.8372.

Since Equation (3) (for example, Equation (4)) holds, the thermal diffusivities of the thermal shock resistant layer 180 and the buffer layer 190 can be calculated approximately by obtaining the porosities of the thermal shock resistant layer 180 and the buffer layer 190 actually provided to the sensor element 100 and then substituting each porosity into Equation (3) (for example, Equation (4)). Then, the thermal diffusion time of each layer in the thickness direction can be approximately obtained by substituting the thickness of the layer and the obtained thermal diffusivity thereof into Equation (2).

The range of the porosities of the test pieces used to derive Equation (4) is substantially a range preferable as the porosity of the thermal shock resistant layer 180, whereas each buffer layer 190 is formed to have a porosity higher than that of the thermal shock resistant layer 180 and thus has a porosity higher than the range of the porosities of the test pieces in some cases. However, since the buffer layer 190 is made of alumina, which is same as that of the thermal shock resistant layer 180, Equation (4) can be applied to a range higher than the range of the porosities of the test pieces through extrapolation as illustrated with a solid line in FIG. 3.

Since the thermal diffusion time can be obtained as described above, the requirements on the thermal shock resistant layer 180 and the buffer layer 190 can be defined by using the thermal diffusion time as an index value as long as there is a strong correlation between the thermal diffusion time and an index value representing the water resistance.

The correlation between the thermal diffusion time and the water resistance was actually checked for the thermal shock resistant layer 180 and each buffer layer 190.

Prepared samples include 17 kinds of sensor elements (hereinafter collectively referred to as samples A) each obtained by forming only the thermal shock resistant layer 180 without the buffer layer 190 after formation up to the surface protective layer 170, and three kinds of sensor elements (hereinafter collectively referred to as samples B) each obtained by forming only the buffer layer 190 without the thermal shock resistant layer 180 after formation of the surface protective layer 170 in the sensor element main part. The thickness and porosity of the thermal shock resistant layer 180 were made different between the individual samples A, and the thickness and porosity of each buffer layer 190 were made different between the individual samples B. The thermal shock resistant layer 180 was formed by plasma spraying.

For all samples, the porosity and thickness of the thermal shock resistant layer 180 or the buffer layer 190 were obtained, and then calculation of the thermal diffusion time based on Equations (4) and (2) by using the obtained values and a water resistance test were performed.

In the water resistance test, water droplets were dropped onto the thermal shock resistant layer 180 on the pump surface at a constant time interval equal to or shorter than 500 msec while each sample is heated by the heater 150 under a heating condition same as that for actual drive of the sensor element 100. The total amount of dropped water when cracking (water-induced cracking) occurred to the sample was obtained as a threshold water wetting amount, and the degree of the water resistance was evaluated based on the magnitude of the threshold water wetting amount. In other words, in the present preferred embodiment, the threshold water wetting amount is used as an index value for the property of the water resistance. A larger threshold water wetting amount indicates that the property of the water resistance is more excellent.

In addition, in the water resistance test, images of the dropping of water droplets onto the thermal shock resistant layer 180 and the buffer layer 190 were captured by a high-speed camera and played back to check whether water is repelled due to the Leidenfrost phenomenon. The check confirmed the water repellency for every sample. This indicates that the occurrence of water-induced cracking in the water resistance test is attributable to thermal shock along with the dropping of water droplets.

Figure 4:
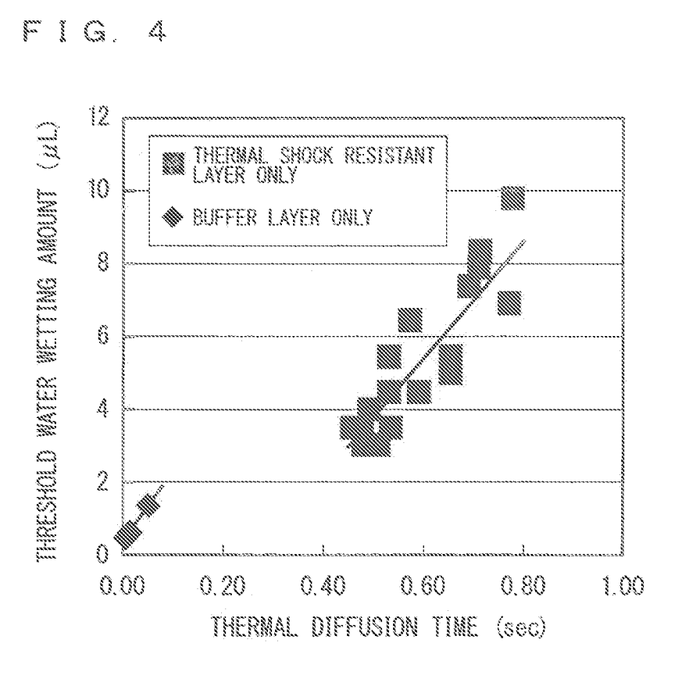
FIG. 4 is a graph plotting a threshold water wetting amount against a thermal diffusion time calculated based on Equations (4) and (2)

FIG. 4 is a graph plotting the threshold water wetting amount against the thermal diffusion time of each sample in the thickness direction of the thermal shock resistant layer 180 or the buffer layer 190, which was calculated based on Equations (4) and (2).

For each of the samples A in which only the thermal shock resistant layer 180 is formed, an approximate straight line illustrated with a solid line along data points has a positive gradient. In other words, there is a positive correlation between the thermal diffusion time in the thickness direction of the thermal shock resistant layer 180 and the threshold water wetting amount. This indicates that it is preferable to use the thermal diffusion time in the thickness direction as an index when the requirements on the thermal shock resistant layer 180 are defined to secure a property of water resistance.

For each of the samples B in which only the buffer layers 190 are formed, the thermal diffusion time was calculated to have a value in the range of 0.17 sec to 0.40 sec, which was smaller in both of the absolute value and the range than those of the thermal shock resistant layer 180 of each sample A. In addition, the threshold water wetting amount was also smaller than that of each sample A, since the buffer layers 190 are not provided to secure a property of water resistance. However, an approximate straight line for the samples B has a positive gradient.

In the actual sensor element 100, each buffer layer 190 is provided only on the pump or heater surface, and the thermal shock resistant layer 180 is always provided on the buffer layer 190. The fact that the threshold water wetting amount for each of the thermal shock resistant layer 180 and the buffer layer 190 has the positive correlation means that the requirements for the property of the water resistance at the pump surface and the heater surface of the sensor element 100 can be defined by using, as an index, the total thermal diffusion time in the direction of stacking of the thermal shock resistant layer 180 and the buffer layer 190, from an outer surface of the thermal shock resistant layer 180 to the surface protective layer 170 through the buffer layer 190. If heat resistance at an interface between the layers is not taken into account because the thermal shock resistant layer 180 and the buffer layer 190 are made of the same alumina, the total thermal diffusion time can be expressed as the sum of the thermal diffusion time of each layer in the thickness direction thereof.

Since the buffer layers 190 are not provided at portions other than the pump surface and the heater surface, the thermal diffusion time in the thickness direction of the thermal shock resistant layer 180 can be used as an index thereof.

As described above, in the present preferred embodiment, at a portion where the thermal shock resistant layer 180 and each buffer layer 190 are stacked, the total thermal diffusion time in the stacking direction of both layers is used as an index for evaluating the water resistance of the thermal shock resistant layer 180, and at a portion where no buffer layer 190 is provided, the thermal diffusion time in the thickness direction of the thermal shock resistant layer 180 is used as the index. The requirements on the thermal shock resistant layer 180 are defined such that the thermal diffusion time satisfies a predetermined range. The thicknesses and porosities of the thermal shock resistant layer 180 and the buffer layer 190 are defined to satisfy the requirements based on the thermal diffusion time. In this case, even when the thermal shock resistant layer 180 is intentionally made to have different thicknesses and porosities at different positions or has unintentional non-uniformity and variance in the thickness and porosity thereof, water-induced cracking is excellently prevented as long as the thermal diffusion time in the thickness direction satisfies a predetermined condition.

<Requirements on Thermal Shock Resistant Layer and Buffer Layer>

The following specifically describes requirements on the thermal diffusion time in the thickness direction, which are to be satisfied by the thermal shock resistant layer 180 and the buffer layer 190.

The following first describes a portion (portion other than the pump surface and the heater surface) where no buffer layer 190 is provided and only the thermal shock resistant layer 180 is provided.

When the gas sensor is attached to an exhaust pipe, the amount of condensed water in the exhaust pipe is approximately 2 µL. According to the graph illustrated in FIG. 4, the threshold water wetting amount is approximately 2 µL or larger when the thermal diffusion time is 0.4 sec or longer. Thus, a property of water resistance is secured at minimum when the thermal diffusion time of the thermal shock resistant layer 180 in the thickness direction is 0.4 sec or longer.

Meanwhile, the upper limit value of the thermal diffusion time is 1.0 sec from a viewpoint of the responsiveness of the sensor element 100. This is because, in view of Equations (2) and (3), increase of the thermal diffusion time thereof in the thickness direction requires increase of the thickness of the thermal shock resistant layer 180 or reduction of the porosity thereof, but either method hinders intake of the measurement gas though the gas inlet 104, and in particular, causes significant decrease of the responsiveness in a range longer than 1.0 sec.

Thus, in the sensor element 100 according to the present preferred embodiment, the thermal diffusion time in the thickness direction is set to 0.4 sec to 1.0 sec at a portion where no buffer layer 190 is provided. In this case, the water-induced cracking attributable to adhesion of water droplets is excellently prevented at the portion.

Accordingly, FIG. 4 illustrates that the thermal shock resistant layer 180 for which the thermal diffusion time in the thickness direction is approximately 0.45 sec to 0.8 sec has been actually formed.

The following describes a portion (the pump surface and the heater surface) where the thermal shock resistant layer 180 and the buffer layer 190 are stacked.

Figure 5:
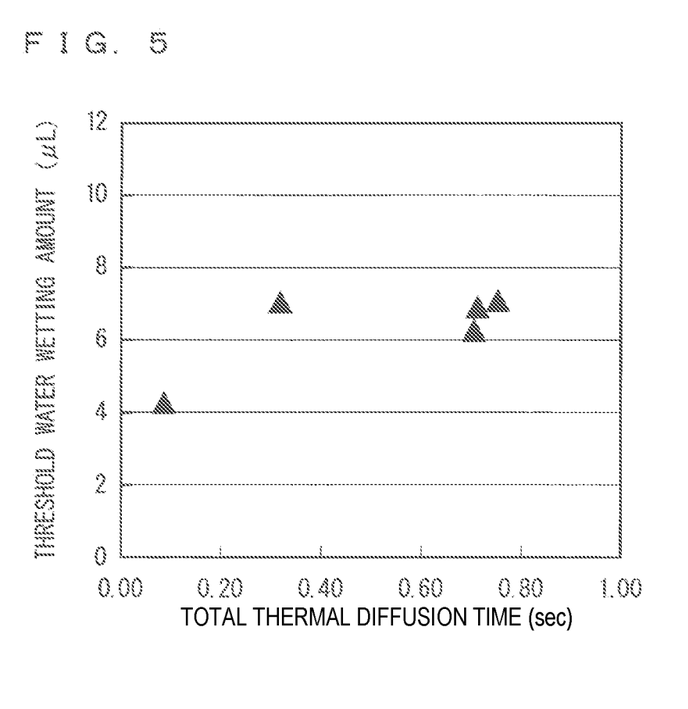
FIG. 5 is a graph plotting a threshold water wetting amount against a total thermal diffusion time based on results shown in Table 1.

For each of the total of six kinds of the sensor elements 100 (No. 1 to 6) including both of the thermal shock resistant layer 180 and the buffer layer 190, Table 1 shows in a list the porosity and thickness of each layer, the thermal diffusion time thereof in the thickness direction calculated based on Equations (4) and (2), and a total thermal diffusion time as the sum of the thermal diffusion times of both layers, together with the threshold water wetting amount obtained by the water resistance test. FIG. 5 is a graph plotting the threshold water wetting amount against the total thermal diffusion time based on the results shown in Table 1.

The porosity and thickness of the buffer layer 190 are actual values measured at the pump surface after formation of the buffer layer 190, but the porosity and thickness of the thermal shock resistant layer 180 are designed values. This is because the thermal shock resistant layer 180 which is also a porous layer is formed on the buffer layer 190 which is also a porous layer having a large porosity and thus relatively large unevenness on an upper surface thereof, and thus variance is likely to occur in the actual thickness of the thermal shock resistant layer 180, which indicates that the measured value does not necessarily have sufficient accuracy.

However, although the water-induced cracking attributable to thermal shock due to adhesion of water droplets may occur locally at any portion of the sensor element 100, which contacts with the measurement gas, the sensor element main part has a non-uniform structure having a shape that differs according to the position, and resistance against thermal shock differs according to the position. Thus, to more reliably prevent the water-induced cracking, the thermal diffusion time is preferably longer at a site where the thermal shock resistance is relatively low.

Considering this point, in the present preferred embodiment, three zones (zone A, zone B, and zone C) are determined in the formation range of the thermal shock resistant layer 180 and the buffer layer 190 as illustrated in FIG. 1, and the requirements on the thermal shock resistant layer 180 and the buffer layer 190, which are necessary for securing a property of water resistance, are defined with these zones taken into consideration.

In the formation range of the thermal shock resistant layer 180 in the longitudinal direction of the sensor element 100, the zones A and B are ranges obtained by equally dividing,

TABLE 1

| | Buffer layer | | | Thermal shock resistant layer | | | Total thermal | Threshold water |
|---|---|---|---|---|---|---|---|---|
| No. | Porosity (%) | Thickness (μm) | Thermal diffusion time (s) | Porosity (%) | Thickness (μm) | Thermal diffusion time (s) | diffusion time (s) | wetting amount (μL) |
| 1 | 29.8 | 20 | 0.40 | 19 | 300 | 0.31 | 0.71 | 6.0 |
| 2 | 29.7 | 30 | 0.40 | 19 | 300 | 0.31 | 0.71 | 6.9 |
| 3 | 29.5 | 60 | 0.40 | 19 | 300 | 0.35 | 0.75 | 7.1 |
| 4 | 29.5 | 20 | 0.04 | 19 | 100 | 0.04 | 0.08 | 4.3 |
| 5 | 29.7 | 20 | 0.18 | 19 | 200 | 0.14 | 0.32 | 7.1 |
| 6 | 29.8 | 20 | 0.40 | 19 | 300 | 0.31 | 0.71 | 6.3 |

Unlike the graph illustrated in FIG. 4, in the graph illustrated in FIG. 5, the threshold water wetting amount equal to or larger than 2 μL is obtained in a range in which the total thermal diffusion time is shorter than 0.4 sec. This means that the lower limit value of a range of the total thermal diffusion time, which is defined as a range in which a property of water resistance is secured, can be reduced at a portion where the thermal shock resistant layer 180 and the buffer layer 190 are stacked, as compared to a portion where no buffer layer 190 is provided. Although FIG. 5 indicates that the lower limit value can be 0.2 sec or shorter, actually, the realization of such a total thermal diffusion time requires reduction of the film thickness of the thermal shock resistant layer 180 and increase of the porosity thereof, in particular, and leads to failure in obtaining the strength of the thermal shock resistant layer 180. For this reason, the lower limit value is set to be 0.2 sec.

For a reason same as that for a portion where no buffer layer 190 is provided, the upper limit value of the total thermal diffusion time is set to be 1.0 sec from a viewpoint of the responsiveness of the sensor element 100.

Accordingly, in the sensor element 100 according to the present preferred embodiment, the thermal diffusion time in the thickness direction of the thermal shock resistant layer 180 is set to 0.4 sec to 1.0 sec at a portion where no buffer layer 190 is provided, and the total thermal diffusion time in the stacking direction of the thermal shock resistant layer 180 and the buffer layer 190 is set to 0.2 sec to 1.0 sec at a portion where the layers are stacked. With this configuration, in the sensor element 100, the water-induced cracking attributable to adhesion of water droplets is excellently prevented.

in two, a range extending from a farthest leading end position (the outer surface of the thermal shock resistant layer 180) at the one end E1 to an end part position of the heater 150 on a side farther from the farthest leading end position. The zone A is the range closer to the one end E1, and the zone B is the range closer to the other end E2.

The zone C is a range positioned on a side farther from the farthest leading end position than the zone B in the formation range of the thermal shock resistant layer 180 in the longitudinal direction of the sensor element 100. In other words, the zone C is a range in which the heater 150 is not provided.

Although it depends on the formation ranges of the heater 150 and the thermal shock resistant layer 180, the ratio of the zones A, B, and C in the longitudinal direction of the sensor element 100 is substantially 1:1:1.

Specifically, the requirements on the thermal diffusion time in the thickness direction of the thermal shock resistant layer 180 and on the total thermal diffusion time in the stacking direction of the thermal shock resistant layer 180 and the buffer layer 190 are defined so that a first condition described below is satisfied. In the first condition, part of the zone A, which covers the gas inlet 104 at the farthest leading end position at the one end E1, is referred to as a "leading end part" (of the thermal shock resistant layer 180) and is distinguished from the remaining part of the zone A.

(First condition): the thermal diffusion time of the "leading end part">the average value of the total thermal diffusion time at the pump surface in the zone A except the leading end part, the zone B, and the zone C≥the average value of the total thermal diffusion time at the heater surface in the zone A except the leading end part, the zone B, and the zone C>the average value of the thermal diffusion time at each of two side surfaces in the zone A except the leading end part, the zone B, and the zone C.

The first condition is based on consideration that the leading end part of the sensor element 100 disposed at a position closest to the center of the exhaust pipe and provided with the gas inlet 104 has the lowest thermal shock resistance, and the pump surface side where a large number of internal spaces are provided has the second lowest thermal shock resistance.

The thermal diffusion time and the total thermal diffusion time at each surface in each zone may be represented by the thermal diffusion time and the total thermal diffusion time, respectively, at a center part of the surface in the zone.

Preferably, requirements on the total thermal diffusion time in the stacking direction of the thermal shock resistant layer 180 and the buffer layer 190 is defined so that a second condition is satisfied in addition to the first condition.

(Second condition): the total thermal diffusion time at the pump surface in the zones A and B>the total thermal diffusion time at the pump surface in the zone C and the total thermal diffusion time at the heater surface in the zones A and B>the total thermal diffusion time at the heater surface in the zone C.

The second condition is based on consideration that temperature difference from water droplets is more likely to occur in the zones A and B, where the heater 150 is provided and which are heated to a higher temperature at operation of the gas sensor, and thus water-induced cracking is more likely to occur.

As above, when the thermal shock resistant layer 180 and the buffer layer 190 are provided so that the first condition is satisfied or the first and second conditions are satisfied, the sensor element 100 in which a property of water resistance is sufficiently secured.

The thermal shock resistant layer 180 that satisfies the first condition or satisfies the first and second conditions can be reliably formed by applying the well-known method such as plasma spraying, spray coating, gel cast, or dipping described above and excellently adjusting conditions in each method. For example, the thermal shock resistant layer 180 can be formed to have different thicknesses and porosities by applying formation conditions different between sites.

As described above, according to the present preferred embodiment, the thermal shock resistant layer covering the element base is provided in the sensor element at the outermost peripheral part within the predetermined range from the end part of the element base where the gas inlet is provided, the buffer layer is provided directly below the thermal shock resistant layer at the pump surface and the heater surface, the thermal diffusion time in the thickness direction of the thermal shock resistant layer is set to 0.4 sec to 1.0 sec at a portion where no buffer layer is provided, and the total thermal diffusion time in the stacking direction of the thermal shock resistant layer and the buffer layer is set to 0.2 sec to 1.0 sec at a portion where the thermal shock resistant layer and the buffer layer are stacked. This configuration excellently reduces water-induced cracking of the sensor element, for example, when the sensor element is attached to an exhaust pipe of an internal combustion such as an engine and used.

In addition, the water-induced cracking can be more reliably prevented by increasing the thermal diffusion time or the total thermal diffusion time at a site having a relatively low thermal shock resistance.

Modification

The above preferred embodiment has described a case in which the thermal shock resistant layer 180 and the buffer layers 190 are provided to the serial double-chamber structure type sensor element 100 having the gas inlet 104 at the one end E1 of the element base. However, the configuration in which the requirements on the thermal shock resistant layer 180 and each buffer layer 190 are defined based on the thermal diffusion time and the total thermal diffusion time is not limited thereto. For example, the configuration is applicable to a serial triple-chamber structure type sensor element including three internal spaces.

Any sensor element that includes no internal space but to which water-induced cracking is likely to occur may include a thermal shock resistant layer and a buffer layer for which the thermal diffusion time and the total thermal diffusion time are adjusted so that no water-induced cracking occurs.

While the invention has been shown and described in detail, the foregoing description is in all aspects illustrative and not restrictive. It is therefore understood that numerous modifications and variations can be devised without departing from the scope of the invention.

What is claimed is:

1. A sensor element of a gas sensor configured to detect a predetermined gas component in measurement gas, the sensor element comprising:

an elongated plate element base made of an oxygen-ion conductive solid electrolyte and having a gas inlet at a first end surface of a first end part and a reference gas inlet in a second end part in a longitudinal direction of said sensor element;

a first internal space and a second internal space provided inside said elongated plate element base and communicated with said gas inlet under predetermined diffusion resistance;

a main electrochemical pump cell including an outer pump electrode formed on an outer surface of said elongated plate element base, a first inner pump electrode provided facing said first internal space, and a first solid electrolyte portion of said elongated plate element base located between said outer pump electrode and said first inner pump electrode, the main electrochemical pump cell configured to pump oxygen in and out between said first internal space and an outside;

an auxiliary electrochemical pump cell including said outer pump electrode formed on the outer surface of said elongated plate element base, a second inner pump electrode provided facing said second internal space, and a second solid electrolyte portion of said elongated plate element base located between said outer pump electrode and said second inner pump electrode, the auxiliary electrochemical pump cell configured to pump oxygen in and out between said second internal space and the outside;

a heater buried inside and surrounded by said oxygen-ion conductive solid electrolyte of said elongated plate element base in a first predetermined range from said first end part of said elongated plate element base in the longitudinal direction of said sensor element;

a porous thermal shock resistant layer provided to an outermost peripheral part of said elongated plate element base and covering said first end surface of said first end part of said elongated plate element base in the longitudinal direction of said sensor element; and buffer layers including a buffer layer located on an inner side with respect to said porous thermal shock resistant layer and adjacent to said porous thermal shock resistant layer on a pump surface of said sensor element, and another buffer layer located on the inner side with respect to said porous thermal shock resistant layer and adjacent to said porous thermal shock resistant layer on a heater surface of said sensor element, the buffer layers being not provided on said first end surface of said first end part of said elongated plate element base, wherein two main surfaces of said elongated plate element base include a main surface closer to said gas inlet, said first and second internal spaces, and said main and auxiliary electrochemical pump cells than to said heater in a thickness direction of said elongated plate element base defined as said pump surface of said sensor element, and another main surface closer to said heater than to said gas inlet, said first and second internal spaces, and said main and auxiliary electrochemical pump cells defined as said heater surface of said sensor element, and opposing side surfaces along both sides of said elongated plate element base are defined as first and second side surfaces, respectively, wherein the porous thermal shock resistant layer is provided on both of said first and second side surfaces of said elongated plate element base while the buffer layers are not provided on either of said first and second side surfaces of said elongated plate element base, and wherein said sensor element is configured and arranged such that:

a thermal diffusion time in a thickness direction of said porous thermal shock resistant layer is 0.4 seconds (sec) to 1.0 sec inclusive at a portion where said buffer layers are not provided between the elongated plate element base and the porous thermal shock resistant layer, a total thermal diffusion time in a stacking direction of said porous thermal shock resistant layer and said buffer layers is 0.2 sec to 1.0 sec inclusive at a portion where said porous thermal shock resistant layer and said buffer layers are stacked, said porous thermal shock resistant layer in a second predetermined range in said longitudinal direction of said sensor element is formed in three zones comprising zone A, zone B, and zone C, where said zone A is adjacent to said zone B and covers said first end surface of said first end part, where lengths of said zone A and said zone B are obtained by equally dividing, in two, a length extending from a leading end surface of said porous thermal shock resistant layer to an end of said first predetermined range of said heater furthest from said first end part, a portion of the second predetermined range that is positioned adjacent to said zone B and closer to said second end part of said sensor element than is said zone B, and in which said heater is not provided, is defined as said zone C, a part of said zone A that covers said gas inlet at said first end surface of said first end part of said elongated plate element base is defined as a leading end part of said porous thermal shock resistant layer, said zone A extends from said leading end part to said first internal space, said zone B extends from said first internal space to said second internal space, said zone C extends from said second internal space at a point beyond the heater toward a second end surface opposite the first end surface in the longitudinal direction of said sensor element, and a first relational expression below is satisfied for the thickness direction of said porous thermal shock resistant layer alone and said stacking direction of said porous thermal shock resistant layer and said buffer layers:

the thermal diffusion time at said leading end part>an average value of the total thermal diffusion time at said pump surface in a center part of each of said zones A, B and C≥an average value of the total thermal diffusion time at said heater surface in said center part of each of said zones A, B and C>an average value of the thermal diffusion time at each of said first and second side surfaces in said center part of each of said zones A, B and C, wherein a thermal shock resistance at said pump surface is higher than a thermal shock resistance at said leading end part and lower than a thermal shock resistance at said heater surface.

2. The sensor element according to claim 1, wherein a second relational expression below is further satisfied in said stacking direction:

the total thermal diffusion time at said pump surface in said zone A and said zone B>the total thermal diffusion time at said pump surface in said zone C, and the total thermal diffusion time at said heater surface in said zone A and said zone B>the total thermal diffusion time at said heater surface in said zone C.

3. The sensor element according to claim 2, wherein said porous thermal shock resistant layer has a thickness of 200 μm to 900 μm inclusive.

4. The sensor element according to claim 3, further comprising a surface protective layer formed on at least part of said pump surface of said elongated plate element base, wherein said buffer layer on said pump surface is interposed between said porous thermal shock resistant layer and said surface protective layer formed on said pump surface, and wherein said surface protective layer formed on said pump surface has a porosity and a thickness that are smaller than a porosity and a thickness of said buffer layer on said pump surface.

5. The sensor element according to claim 4, further comprising another surface protective layer formed on said heater surface, wherein said another buffer layer on said heater surface is interposed between said porous thermal shock resistant layer and said another surface protective layer formed on said heater surface, and wherein said another surface protective layer formed on said heater surface has a porosity and a thickness that are smaller than a porosity and a thickness of said another buffer layer on said heater surface.

6. The sensor element according to claim 2, further comprising a surface protective layer formed on at least part of said pump surface of said elongated plate element base, wherein said buffer layer on said pump surface is interposed between said porous thermal shock resistant layer and said surface protective layer formed on said pump surface, and wherein said surface protective layer formed on said pump surface has a porosity and a thickness that are smaller than a porosity and a thickness of said buffer layer on said pump surface.

7. The sensor element according to claim 6, further comprising another surface protective layer formed on said heater surface, wherein said another buffer layers on said heater surface is interposed between said porous thermal shock resistant layer and said another surface protective layer formed on said heater surface, and wherein said another surface protective layer formed on said heater surface has a porosity and a thickness that are smaller than a porosity and a thickness of said another buffer layer on said heater surface.

8. The sensor element according to claim 1, wherein said porous thermal shock resistant layer has a thickness of 200 µm to 900 µm inclusive.

9. The sensor element according to claim 8, further comprising a surface protective layer formed on at least part of said pump surface of said elongated plate element base,
wherein said buffer layer on said pump surface is interposed between said porous thermal shock resistant layer and said surface protective layer formed on said pump surface, and
wherein said surface protective layer formed on said pump surface has a porosity and a thickness that are smaller than a porosity and a thickness of said buffer layer on said pump surface.

10. The sensor element according to claim 9, further comprising anther surface protective layer formed on said heater surface,
wherein said another buffer layers on said heater surface is interposed between said porous thermal shock resistant layer and said another surface protective layer formed on said heater surface, and
wherein said another surface protective layer formed on said heater surface has a porosity and a thickness that are smaller than a porosity and a thickness of said another buffer layer on said heater surface.

11. The sensor element according to claim 1, further comprising a surface protective layer formed on at least part of said pump surface of said elongated plate element base,
wherein said buffer layer on said pump surface is interposed between said porous thermal shock resistant layer and said surface protective layer formed on said pump surface, and
wherein said surface protective layer formed on said pump surface has a porosity and a thickness that are smaller than on said pump surface.

12. The sensor element according to claim 11, further comprising another surface protective layer formed on said heater surface,
wherein said another buffer layers on said heater surface is interposed between said porous thermal shock resistant layer and said another surface protective layer formed on said heater surface, and
wherein said another surface protective layer formed on said heater surface has a porosity and a thickness that are smaller than a porosity and a thickness of said another buffer layer on said heater surface.

13. The sensor element according to claim 1, wherein
the elongated plate element base is formed from zirconia,
the porous thermal shock resistant layer is formed from alumina and has a porosity of 15% to 25%, and
the buffer layers are formed from alumina and have a porosity of 25% to 30%, which is higher than that of the porous thermal shock resistant layer.

\* \* \* \* \*